3,028,310
METHOD OF PRODUCING L-VALINE BY FERMENTATION
Shukuo Kinoshita and Shigezo Udaka, Tokyo, Japan, assignors to Kyowa Hakko Kogyo Kabushiki Kaisha, Tokyo, Japan, a corporation of Japan
No Drawing. Filed Sept. 15, 1959, Ser. No. 840,018
Claims priority, application Japan Oct. 11, 1958
10 Claims. (Cl. 195—47)

This invention is directed to a fermentation process for the production of L-valine at a low cost. More specifically the invention is directed to the cultivation of defined microorganisms in a medium containing carbohydrates, nitrogen sources and inorganic substances, and the recovery of L-valine produced.

L-valine is one of the essential amino acids which is necessary for the maintenance of health and the proper assimilation of foods in animals. The determination of minimum requirements of L-valine in man has been determined (Rose, William C., "Amino Acid Requirements of Man," Federation Proceedings, published by the Federation of American Societies for Experimental Biology, volume 8, number 2, June 1949, pp. 546 to 552). Accordingly, this amino acid is of considerable commercial importance. It is useful as a nutrient or a nutrient supplement.

Heretofore, L-valine has been obtained from protein hydrolyzates. However, it is technically difficult to recover L-valine in a pure state from the protein hydrolyzates containing various neutral amino acids; and also an expensive proteinous material is required as raw materials.

The inventors have found a method of producing a good yield of L-valine according to a fermentation process using certain microorganisms. In accordance with the method of this invention, the L-valine accumulated in a considerable amount in the medium is essentially free of other amino acids. Therefore, it is very easy to isolate and recover L-valine in the pure state from the medium. A method of producing L-valine on a commercial scale is thus established.

The object of this invention is to provide a commercially feasible process for the preparation of L-valine at a low cost.

It is now established that a large quantity of L-valine can be produced by cultivating certain microorganisms under such culturing conditions as are detailed hereinafter. High yield (of L-valine) producting microorganisms, contemplated in accord with this invention, are such microorganisms as *Aerobacter aerogenes, Klebsiella pneumoniae, Paracolobactrum intermedium, Paracolobactum coliforme, Alginobacter acidofaciens, Erwinia cartotovera, Proteus vulgaris, Salmonella paratyphi* and *Shigella flexneri*. Among these species, microorganisms belonging to the species of *Paracolobactrum coliforme, Aerobacter aerogenes* and *Serratia marcescens* are preferably employed for high yields of L-valine. All abovementioned microorganisms are known species, and cultures thereof are available from various public culture collections. Furthermore, various strains may be isolated from natural materials and can be identified by published descriptions, such as "Bergey's Manual of Determinative Bacteriology," Breed, Robert S., Murray, E.G.D., and Smith, Nathan R., seventh edition, The Williams & Wilkins Company, Baltimore, Md., 1957, for use in the present process.

In conducting the present process; either a synthetic or an organic nutrient medium can be used. The medium, however, must contain carbohydrates, nitrogen sources and inorganic substances as hereinafter defined. As carbohydrates and nitrogen sources in the medium any substance which can be utilized by the employed bacterium can be used, but the class of the substance may be selected appropriately corresponding to the employed bacterium. Such selections may be readily made by any one skilled in the art in accordance with the disclosures of published descriptions, e.g. Bergey's Manual, supra, which disclose the carbohydrate and nitrogen utilization of employed bacterium.

As for the carbohydrates, in general, glucose, sucrose, fructose, mannose, maltose, galactose and xylose may be used. Other carbohydrates, such as molasses, hydrolyzed starch and the like may also be used. These fermentable carbohydrates can be employed in a concentration from 2 to 15% (based on glucose equivalent) by weight of the medium.

As for nitrogen sources, ammonium salts, such as ammonium chloride, ammonium sulphate, ammonium phosphate, ammonium lactate, ammonium carbonate and ammonium nitrate are preferred. Other inorganic or organic nitrogen sources, such as sodium nitrate, urea, peptone, meat extract, NZ-amine (trade name of the material, an enzymatic digest of casein for microbiological use, manufactured by Sheffield Chemical Company Inc., Norwich, New York), corn steep liquor, yeast extract and soybean hydrolyzates may also be used.

As for the inorganic substances, potassium monohydrogen phosphate, potassium dihydrogen phosphate, ammonium monohydrogen phosphate, ammonium dihydrogen phosphate, magnesium sulphate, ferrous sulphate, manganese sulphate and calcium carbonate may be used. In addition, certain growth-promoting agents such as vitamins, amino acids and the like may be conveniently used in the medium, if necessary.

The cultivation may be carried out at a cultivation temperature of from 20 to 40° C. and at a pH of 4.5 to 8, ordinarily for from one to four days, under such an aerobic condition as shaking culture or aerobic agitating submerged culture.

After completion of the cultivation, the mycelium is removed by filtration or centrifugation, and then the filtrate or supernatant is concentrated to from $\frac{1}{10}$ to $\frac{1}{20}$ of its original volume under a reduced pressure of from 1 to 20 millimeters in mercury. The pH of the concentrated solution thus obtained is adjusted to six by addition of sodium hydroxide or hydrochloric acid, and thereafter this concentrated solution is combined with from two to three times its volume of 95% (by volume) ethanol and allowed to stand in a cold chamber having a temperature of from 0 to 5° C. until crude crystals of L-valine crystallize out. Then the crystals thus produced are separated and dried by a conventional method to recover the L-valine.

The following examples, which are intended as informative and typical only and not in a limiting sense, will illustrate the present invention.

*Example 1*

To a fermentation medium there is applied 1 ml. (milliliter) of *Paracolobactrum coliforme*, which has been grown as an inoculating bacterium by means of a shaking culture at 28° C. for 18 hours. A fermentation medium to be used is prepared as follows: 50 gr. (grams) of glucose, 1 gr. of $KH_2PO_4$, 0.5 gr. of $MgSO_4 \cdot 7H_2O$ and 5 gr. of urea are dissolved in distilled water and made up to 1 liter (pH about 7.0). Each 20 ml. of this medium is distributed in a separate 250 ml. Erlenmeyer flask and then sterilized. Thereafter urea, $(NH_4)_2HPO_4$, $(NH_4)H_2PO_4$ and $CaCO_3$, which are separately sterilized, are added in an amount of 0.3 gr., 0.15 gr., 0.15 gr. and 0.6 gr., respectively, to each of the media.

After carrying out a shaking culture at a culturing temperature of 28° C. for 48 hours, there is no remaining glucose in the broth, and the amount of L-valine produced is 7.8 mg. (milligrams)/ml.

The mycelium is removed from this culture broth by filtration. One liter of the filtrate is concentrated to 100 ml. under a reduced pressure of about 10 millimeters of mercury, and then this concentrated solution is adjusted to a pH of 6.0 with 1 N NaOH and added to twice its volume of 95% (by volume) ethanol. Thereafter, the resulting solution is allowed to stand for 24 hours in a cold chamber at 0° C. until crude crystals of L-valine crystallize out. The crude crystals thus produced are then separated by filtration and dried at room temperature in desiccator, and 6.2 gr. of the L-valine (purity: 95%) are obtained.

*Example 2*

Except for the fact that synthetic medium (pH about 7.0) containing 50 gr. of glucose, 1 gr. of $KH_2PO_4$, 0.2 gr. of $MgSO_4 \cdot 7H_2O$, 20 gr. of $NH_4Cl$, 20 gr. of $CaCO_3$, 5 gr. of urea and water to make 1 liter is used as a fermentation medium, and that *Aerobacter aerogenes* is used as inoculating bacterium, the cultivation is carried out in the same manner as in Example 1.

After cultivation for 48 hours, the amount of L-valine produced in the cultured broth is 4.5 mg./ml.

In addition to the exemplified media, other media can be employed. Examples of other media are:

(1) Synthetic medium containing 50 gr. of sucrose, 1 gr. of $KH_2PO_4$, 0.5 gr. of $MgSO_4 \cdot 7H_2O$, 15 gr. of $(NH_4)_2SO_4$ and water to make 1 liter, and being adjusted to a pH of 7.0 with caustic soda;

(2) Culture medium (pH about 7.0) containing 50 gr. of glucose, 1 gr. of $KH_2PO_4$, 0.5 gr. of $MgSO_4 \cdot 7H_2O$, 2 gr. of peptone, 2 gr. of meat extract, 20 gr. of $(NH_4)_2SO_4$, 30 gr. of $CaCO_3$ and water to make 1 liter; and (3) Culture medium (pH about 7.0) containing 50 gr. of glucose, 1 gr. of $KH_2PO_4$, 0.5 gr. of $MgSO_4 \cdot 7H_2O$, 2 gr. of NZ-amine, 20 gr. of $(NH_4)_2SO_4$, 20 gr. of $CaCO_3$ and water to make 1 liter.

In the same manner as indicated in the specific examples for particular species, other species identified supra, can be employed to produce L-valine by fermentation under aerobic conditions in media containing carbohydrates, nitrogen sources and inorganic substances.

The invention and its advantages are readily understood from the foregoing description. It is apparent that various changes may be made without departing from the spirit and the scope of the invention or sacrificing its material advantages. The preceding exemplifications are merely illustrative of preferred embodiments of the invention.

We claim:

1. In the production of L-valine essentially free from other amino acids, the improvement wherein a microorganism selected from the group consisting of *Klebsiella pneumoniae, Paracolobactrum intermedium, Alginobacter acidofaciens, Erwinia carotovora, Paracolobactrum coliforme* and *Aerobacter aerogenes* is aerobically cultured under fermentation conditions in a medium containing carbohydrate, nitrogen source and inorganic substance.

2. In the production of L-valine essentially free from other amino acids, the improvement wherein *Klebsiella pneumoniae* is aerobically cultured under fermentation conditions in a medium containing carbohydrate, nitrogen source and inorganic substance.

3. In the production of L-valine essentially free from other amino acids, the improvement wherein *Paracolobactrum intermedium* is aerobically cultured under fermentation conditions in a medium containing carbohydrate, nitrogen source and inorganic substance.

4. In the production of L-valine essentially free from other amino acids, the improvement wherein *Alginobacter acidofaciens* is aerobically cultured under fermentation conditions in a medium containing carbohydrate, nitrogen source and inorganic substance.

5. In the production of L-valine essentially free from other amino acids, the improvement wherein *Erwinia carotovora* is aerobically cultured under fermentation conditions in a medium containing carbohydrate, nitrogen source and inorganic substance.

6. In the production of L-valine essentially free from other amino acids, the improvement wherein *Proteus vulgaris* is aerobically cultured under fermentation conditions in a medium containing carbohydrate, nitrogen source and inorganic substance.

7. In the production of L-valine essentially free from other amino acids, the improvement wherein *Salmonella paratyphi* is aerobically cultured under fermentation conditions in a medium containing carbohydrate, nitrogen sources and inorganic substance.

8. In the production of L-valine essentially free from other amino acids, the improvement wherein *Shigella flexneri* is aerobically cultured under fermentation conditions in a medium containing carbohydrate, nitrogen source and inorganic substance.

9. A method of producing L-valine by fermentation which comprises culturing *Paracolobactrum coliforme* at a pH of from about 4.5 to about 8, at a temperature of from about 20° to about 40° C. and under aerobic conditions in a medium containing carbohydrate, nitrogen source and inorganic substance, whereby L-valine is produced in said medium, and recovering the L-valine produced.

10. A method of producing L-valine by fermentation which comprises culturing *Aerobacter aerogenes* at a pH of from about 4.5 to about 8, at a temperature of from about 20° to about 40° C. and under aerobic conditions in a medium containing carbohydrates, nitrogen source and inorganic substance, whereby L-valine is produced in said medium, and recovering the L-valine produced.

References Cited in the file of this patent

Kinoshita et al.: Journal of General Applied Microbiology, vol. 3, Nov. 3, 1957, pp. 193–205, Tokyo.

Kinoshita: Advances in Applied Microbiology, Aug. 14, 1959, pp. 201–214, page 211 particularly relied upon.

Gagley et al.: article published in Biochemica et Biophysica Acta, vol. 21, pp. 270 to 276 (1956), QD1B5.